(12) United States Patent
Fujita

(10) Patent No.: US 12,062,359 B2
(45) Date of Patent: Aug. 13, 2024

(54) RESPONSE GENERATION DEVICE AND RESPONSE GENERATION METHOD

(71) Applicant: SONY GROUP CORPORATION, Tokyo (JP)

(72) Inventor: Takuya Fujita, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 359 days.

(21) Appl. No.: 17/598,374

(22) PCT Filed: Feb. 27, 2020

(86) PCT No.: PCT/JP2020/008085
§ 371 (c)(1),
(2) Date: Sep. 27, 2021

(87) PCT Pub. No.: WO2020/208972
PCT Pub. Date: Oct. 15, 2020

(65) Prior Publication Data
US 2022/0157293 A1 May 19, 2022

(30) Foreign Application Priority Data

Apr. 8, 2019 (JP) .................... 2019-073840

(51) Int. Cl.
*G10L 13/08* (2013.01)
*G10L 15/18* (2013.01)
(Continued)

(52) U.S. Cl.
CPC .......... *G10L 13/08* (2013.01); *G10L 15/1815* (2013.01); *G10L 15/22* (2013.01);
(Continued)

(58) Field of Classification Search
CPC ..... G10L 13/08; G10L 15/1815; G10L 15/22; G10L 15/26; G10L 21/0208; G10L 25/84
See application file for complete search history.

(56) References Cited

U.S. PATENT DOCUMENTS 9,070,366 B1 * 6/2015 Mathias .................. G10L 15/22
10,032,451 B1 * 7/2018 Mamkina ................ G06F 21/32
(Continued)

FOREIGN PATENT DOCUMENTS

| JP | 2004-163541 A | 6/2004 |
|---|---|---|
| JP | 2015-114527 A | 6/2015 |

(Continued)

OTHER PUBLICATIONS

International Search Report and Written Opinion of PCT Application No. PCT/JP2020/008085, issued on Jun. 2, 2020, 09 pages of ISRWO.

*Primary Examiner* — Sonia L Gay
(74) *Attorney, Agent, or Firm* — CHIP LAW GROUP

(57) ABSTRACT

A response generation device includes an acquisition unit that acquires input information that triggers generation of a response to a user, and a response generation unit that selects, on the basis of an analysis result of the input information, a model to be used in generating a response corresponding to the input information and generates a response to the user using the selected model. For example, the acquisition unit acquires voice information uttered by the user as the input information.

19 Claims, 11 Drawing Sheets

(51) Int. Cl.
*G10L 15/22* (2006.01)
*G10L 15/26* (2006.01)
*G10L 21/0208* (2013.01)
*G10L 25/84* (2013.01)

(52) U.S. Cl.
CPC .......... *G10L 15/26* (2013.01); *G10L 21/0208* (2013.01); *G10L 25/84* (2013.01)

(56) References Cited

U.S. PATENT DOCUMENTS

| | | | |
|---|---|---|---|
| 2008/0319748 | A1 | 12/2008 | Nakano et al. |
| 2011/0257974 | A1* | 10/2011 | Kristjansson ....... G10L 21/0208 455/456.1 |
| 2015/0081288 | A1* | 3/2015 | Kim ....................... G10L 15/30 704/231 |
| 2016/0336024 | A1 | 11/2016 | Choi et al. |
| 2019/0235831 | A1* | 8/2019 | Bao ........................ G10L 15/19 |
| 2019/0325864 | A1* | 10/2019 | Anders .................. G10L 15/22 |
| 2020/0075044 | A1* | 3/2020 | Jankowski, Jr. ........ G10L 17/04 |
| 2020/0184992 | A1* | 6/2020 | Newell ................... G10L 15/26 |

FOREIGN PATENT DOCUMENTS

| | | |
|---|---|---|
| JP | 2017-037176 A | 2/2017 |
| KR | 10-2016-0132748 A | 11/2016 |
| WO | 2007/088877 A1 | 8/2007 |

\* cited by examiner

FIG.3

| MODEL ID | NOISE RESISTANCE | APPLICATION CONDITION | | ... |
| --- | --- | --- | --- | --- |
| | | SN RATIO | ... | |
| ... | ... | ... | ... | ... |
| M01 | LOW | 30 TO 60 | ... | ... |
| M02 | MEDIUM | 10 TO 30 | ... | ... |
| M03 | HIGH | -5 TO 10 | ... | ... |
| ... | ... | ... | ... | ... |

FIG.4

| MODEL ID | NOISE RESISTANCE | APPLICATION CONDITION | | |
|---|---|---|---|---|
| | | NON-SENTENCE LEVEL | LANGUAGE MODEL MATCHING | GRAMMAR MODEL MATCHING |
| ... | ... | ... | ... | ... |
| M11 | LOW | B01 | C01 | D01 |
| M12 | MEDIUM | B02 | C02 | D02 |
| M13 | HIGH | B03 | C03 | D03 |
| ... | ... | ... | ... | ... |

| CONDITION ID | APPLICATION CONDITION | | | | MODEL ID | NOISE RESISTANCE |
|---|---|---|---|---|---|---|
| | SN RATIO LOWER LIMIT | CONTEXT (DOMAIN) | CONTEXT (SLOT) | ... | | |
| ... | ... | ... | ... | ... | ... | ... |
| F01 | 30 | NO CONDITION | NO CONDITION | ... | M21 | LOW |
| F02 | 10 | NO CONDITION | NO CONDITION | ... | M22 | MEDIUM |
| F03 | 30 | OOD | NO CONDITION | ... | M21-OOD | LOW |
| F04 | 10 | OOD | NO CONDITION | ... | M22-OOD | MEDIUM |
| F05 | 25 | WEATHER | NO CONDITION | ... | M21-WEATHER | LOW |
| F06 | 5 | WEATHER | NO CONDITION | ... | M22-WEATHER | MEDIUM |
| ... | ... | ... | ... | ... | ... | ... |

| CONDITION ID | APPLICATION CONDITION ||||| MODEL ID | NOISE RESISTANCE |
| --- | --- | --- | --- | --- | --- | --- | --- |
| | SN RATIO LOWER LIMIT | CONTEXT (DOMAIN) | CONTEXT (SLOT) | ... | | | |
| ... | ... | ... | ... | ... | ... | ... | ... |
| F11 | 30 | NO CONDITION | NO CONDITION | ... | M21 | LOW |
| F12 | 10 | NO CONDITION | NO CONDITION | ... | M22 | MEDIUM |
| F13 | 25 | WEATHER | NO CONDITION | ... | M21-WEATHER | LOW |
| F14 | 5 | WEATHER | NO CONDITION | ... | M22-WEATHER | MEDIUM |
| F15 | 20 | WEATHER | TARGET_PLACE | ... | M21-WEATHER-TG | LOW |
| F16 | 0 | WEATHER | TARGET_PLACE | ... | M22-WEATHER-TG | MEDIUM |
| ... | ... | ... | ... | ... | ... | ... |

| CONDITION ID | APPLICATION CONDITION ||||| MODEL ID | NOISE RESISTANCE |
| --- | --- | --- | --- | --- | --- | --- | --- |
| | SN RATIO LOWER LIMIT | CONTEXT (DOMAIN) | CONTEXT (SLOT) | ... | | | |
| ... | ... | ... | ... | ... | ... | ... | ... |
| F21 | 30 | NO CONDITION | NO CONDITION | ... | M21 | LOW |
| F22 | 10 | NO CONDITION | NO CONDITION | ... | M22 | MEDIUM |
| F23 | 30 | NO CONDITION | NONE | ... | M21-ALL-NONE | LOW |
| F24 | 10 | NO CONDITION | NONE | ... | M22-ALL-NONE | MEDIUM |
| F25 | 25 | NO CONDITION | PLACE | ... | M21-ALL-PLACE | LOW |
| F26 | 5 | NO CONDITION | PLACE | ... | M22-ALL-PLACE | MEDIUM |
| ... | ... | ... | ... | ... | ... | ... |

37

RESPONSE GENERATION DEVICE AND RESPONSE GENERATION METHOD

CROSS REFERENCE TO RELATED APPLICATIONS

This application is a U.S. National Phase of International Patent Application No. PCT/JP2020/008085 filed on Feb. 27, 2020, which claims priority benefit of Japanese Patent Application No. JP 2019-073840 filed in the Japan Patent Office on Apr. 8, 2019. Each of the above-referenced applications is hereby incorporated herein by reference in its entirety.

FIELD

The present disclosure relates to a response generation device and a response generation method. Specifically, the present disclosure relates to processing of generating a response to be output to a user who uses an information device.

BACKGROUND

With spread of smartphones and smart speakers, interaction systems for making appropriate responses to users in response to an utterance received from a user, a user action, and the like have been widely used. The interaction system is required to accurately recognize a voice of the user and make an appropriate response.

For example, there is known a technique for estimating false recognition of voice recognition by specifying an execution task candidate for a received voice and specifying reliability of the execution task candidate. Further, there is known a technology that allows a user to enjoy convenience of a voice agent system even when the user is in a situation not suitable for utterance by receiving an operation from the user on the basis of an instruction sentence displayed on a screen.

CITATION LIST

Patent Literature

Patent Literature 1: JP 2017-37176 A
Patent Literature 2: JP 2015-114527 A

SUMMARY

Technical Problem

According to the above-described conventional technology, convenience of the voice agent system can be improved.

However, in the related art, it is not always possible to achieve highly stable (robust) interactive processing with respect to the utterance of the user. Specifically, in the related art, in a case where input information such as an utterance of the user is difficult to recognize, asking back is performed or an alternative means is provided, and it is not always possible to improve stability of the interactive processing itself.

Accordingly, the present disclosure proposes a response generation device and a response generation method capable of achieving highly stable interactive processing for an utterance of a user.

Solution to Problem

According to the present disclosure, a response generation device includes an acquisition unit that acquires input information that triggers generation of a response to a user; and a response generation unit that selects, on a basis of an analysis result of the input information, a model to be used in generating a response corresponding to the input information and generates a response to the user using the selected model.

BRIEF DESCRIPTION OF DRAWINGS

FIG. 3 is a diagram illustrating an example of a first model table according to the embodiment.
FIG. 4 is a diagram illustrating an example of a second model table according to the embodiment.
FIG. 7 is a diagram illustrating an example of a model table according to a first modification example.
FIG. 8 is a diagram illustrating an example of a model table according to a second modification example.
FIG. 9 is a diagram illustrating an example of a model table according to a third modification example.

DESCRIPTION OF EMBODIMENTS

Figure 1:
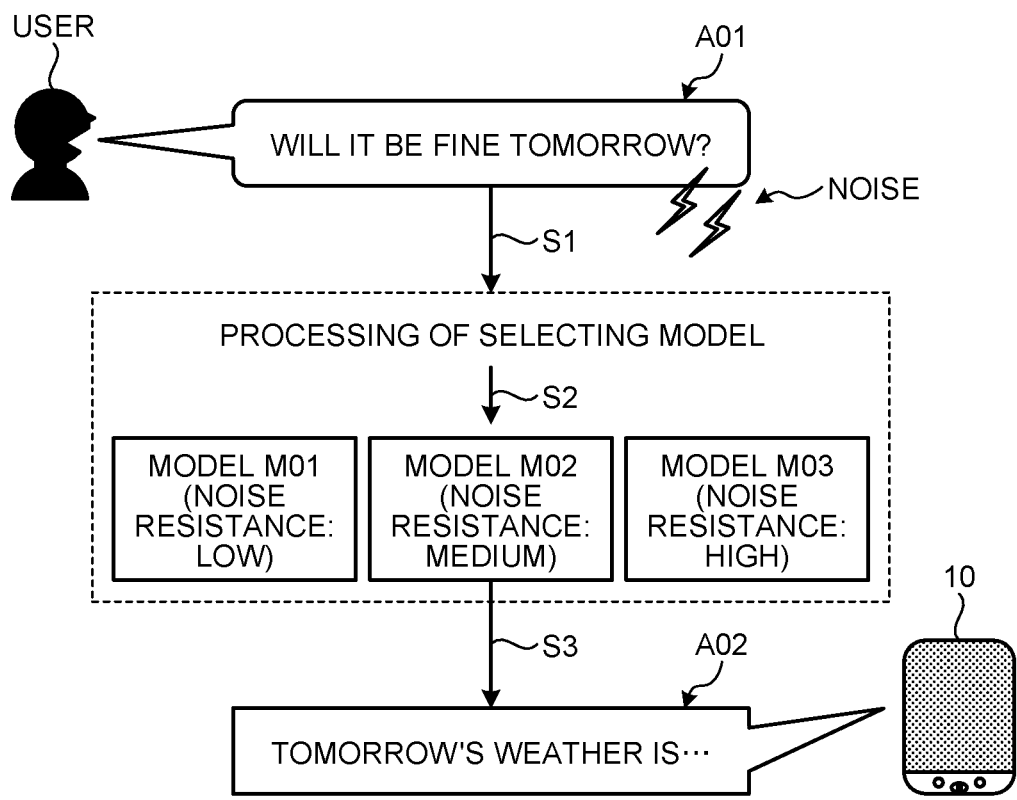
FIG. 1 is a diagram illustrating an example of information processing according to an embodiment.

Hereinafter, embodiments of the present disclosure will be described in detail with reference to the drawings. Note that in each of the following embodiments, the same parts are denoted by the same reference numerals, and redundant description will be omitted.

The present disclosure will be described according to the following order of items.

1. Embodiment
1-1. Example of information processing according to embodiment
1-2. Configuration of response generation system according to embodiment
1-3. Procedure of information processing according to embodiment
1-4. Modification example according to embodiment
1-4-1. Model selection using content information
1-4-2. Model selection using reliability
2. Other embodiments
3. Effects of response generation device according to present disclosure
4. Hardware configuration

1. Embodiment

1-1. Example of Information Processing According to Embodiment

An example of information processing according to an embodiment will be described with reference to FIG. 1. FIG.

1 is a diagram illustrating an example of information processing according to the embodiment. The information processing according to the embodiment is executed by a response generation device 10 illustrated in FIG. 1.

The response generation device 10 is an example of a response generation device according to the present disclosure. The response generation device 10 is a device that interacts with the user, and performs various types of information processing such as voice recognition and response. The voice recognition, the response processing by voice, and the like executed by the response generation device 10 may be referred to as an agent function. Further, the response generation device 10 may be referred to as an agent device.

In the embodiment, an example in which the response generation device 10 is what is called a smart speaker is illustrated. Note that the response generation device 10 may include not only a speaker unit that outputs sound but also a display unit (liquid crystal display or the like) that outputs a video or the like. Further, the response generation device 10 may be a smartphone, a tablet terminal, or the like. In this case, the smartphone or the tablet terminal functions as the response generation device 10 according to the present disclosure by executing a program (application) for achieving the response generation processing of the present disclosure.

Further, the response generation device 10 may be a wearable device such as a watch-type terminal or a glasses-type terminal in addition to a smartphone or a tablet terminal. Furthermore, the response generation device 10 may be achieved by various smart devices having an information processing function. For example, the response generation device 10 may be a smart home appliance such as a television, an air conditioner, or a refrigerator, a smart vehicle such as an automobile, a drone, a home robot, or the like.

In the example of FIG. 1, the response generation device 10 executes response processing for information (hereinafter referred to as "input information") that triggers generation of a response, such as a collected voice or an action of the user. For example, the response generation device 10 recognizes a question uttered by the user, outputs an answer to the question by voice, and/or displays information regarding the question on a screen. Note that various known techniques may be used for voice recognition processing, output processing, and the like executed by the response generation device 10.

Here, the agent device desirably achieves stable semantic analysis even in a situation where there is an obstacle in performing semantic analysis of the input voice (for example, a situation where accuracy of voice recognition is reduced due to presence of strong noise, or the like). That is, the agent device has an object of achieving highly stable interactive processing with respect to an utterance of the user.

Accordingly, the response generation device 10 according to the present disclosure achieves the above object by processing illustrated in FIG. 1. Specifically, upon acquiring input information that triggers generation of a response to the user, the response generation device 10 analyzes the input information and selects a model to be used in generating a response corresponding to the input information on the basis of an analysis result. Then, the response generation device 10 generates a response to the user using the selected model. For example, the response generation device 10 retains a plurality of models having different noise resistances in advance, and selects a model to be used for semantic analysis according to a noise situation of an input voice.

As described above, the response generation device 10 can adjust semantic analysis processing of voice and granularity of generating a response, for example, by performing semantic analysis using one model according to the situation from a plurality of models having different noise resistances. Thus, the response generation device 10 can generate a response as appropriate as possible to the content uttered by the user, rather than a response of asking back such as "I didn't catch that well", for an utterance or the like of the user in an environment not suitable for voice recognition. Note that the model indicates a concept that collectively refers to various types of information used for generating a response to the user, such as a type of information processing, a type of corpus, and a type of dictionary data used for the semantic analysis processing.

Note that, in the above description, it has been described that the response generation device 10 is a single device, but this is not limited to this example. For example, the response generation device 10 may be configured as a system by a combination of a terminal device and a server device that can communicate with each other via a network or the like.

As an example, the terminal device includes an input means for inputting information such as a voice, and transmits, for example, an input voice to the server device. The server device executes voice recognition based on the voice transmitted from the terminal device and response generation processing of the present disclosure based on a voice recognition result, and transmits a result of the response generation processing to the terminal device. The terminal device further includes a presentation means for presenting information to the user by an image or voice, and performs display or voice output based on a result of the response generation processing transmitted from the server device. Not limited to this, the terminal device may be configured to further execute voice recognition.

As such a terminal device, the above-described smart speaker, smartphone, tablet terminal, wearable device, smart home appliance, smart vehicle, drone, home robot, and the like can be applied.

Hereinafter, an example of information processing (response generation processing) according to the present disclosure will be described along the flow with reference to FIG. 1.

As illustrated in FIG. 1, the user utters "will it be fine tomorrow?" to input a voice A01 including contents such as "will it be fine tomorrow?" to the response generation device 10 (step S1). Note that in the example of FIG. 1, it is assumed that a strong environmental sound (noise) of lightning or the like occurs in the environment where the user utters.

The response generation device 10 starts the response generation processing with the voice A01 as input information. For example, the response generation device 10 acquires the voice A01, and generates a response corresponding to the voice A01 through automatic speech recognition (ASR) processing, natural language understanding (NLU) processing, and the like. For example, in a case where an intention of a question from the user is included in the voice A01, the response generation device 10 recognizes the intention of the question as input information and generates an answer to the intention of the question as a response.

In the embodiment, the response generation device 10 analyzes the voice A01 on the basis of signal processing. For example, the response generation device 10 estimates a noise level in the input voice A01. Specifically, the response generation device 10 calculates a signal-to-noise ratio (SN ratio) of the voice A01 and estimates the noise level of the voice A01. Note that various known techniques may be used for analysis such as calculation of the SN ratio.

In the response generation processing, after acquiring the voice, semantic understanding processing of the voice is executed. In general, a model learned in advance for analyzing the intention of the user is used for semantic analysis processing. Here, the response generation device 10 executes processing of selecting the model on the basis of the estimated noise level (step S2).

In the example of FIG. 1, it is assumed that the response generation device 10 retains three types of models including a model M01, a model M02, and a model M03 in a storage unit as models to be used for semantic analysis.

The model M01 is a model having a relatively low noise resistance. A model having a low noise resistance tends to have a high level of detail in semantic analysis. In other words, when it is attempted to increase the degree of detail of the semantic analysis, it may be necessary to lower the noise resistance. Although details will be described later, the model with a low noise resistance is, for example, a model in which a relatively large number of settings of the number of words used in semantic analysis are set (for example, 1- to 3-grams are set in N-gram analysis) or a model using a clean corpus without noise. Further, the model with a low noise resistance performs dictionary conversion with relatively low flexibility. For example, in the model with a low noise resistance, in a case where a voice is input and it is not possible to determine any one of homonyms for the voice, a process of asking back to the user is performed.

For example, the model M01 is a model that outputs, for example, "WEATHER-CHECK-SUNNY" to the voice A01. Such a semantic analysis result (also referred to as a domain goal, a frame, or the like) indicates that the response generation device 10 has analyzed the voice A01 as "a request utterance related to weather check asking whether it will be fine". That is, the model M01 is a model that has a high granularity of answer, and can process the utterance of the user with connection of more words and generate a more natural response.

The Model M03 is a model having a relatively high noise resistance. A model having a high noise resistance tends to have a low level of detail in semantic analysis. In other words, when it is attempted to increase the noise resistance, it may be necessary to lower the level of detail of the semantic analysis. Although details will be described later, the model having a high noise resistance is, for example, a model in which setting of the number of words used in semantic analysis is limited to be relatively small (for example, only 1-gram is used in N-gram analysis), or a corpus to which noise is added is used. Further, a model having a high noise resistance performs dictionary conversion having relatively high flexibility. For example, a model with a high noise resistance is a model in which even when a voice is input but and it is not possible to determine which of homonyms the sound is, the interactive processing is performed assuming that the homonyms are widely the same.

For example, the model M03 is a model that outputs, for example, "WEATHER-NONE" to the voice A01. Such a domain goal indicates a meaning that the response generation device 10 has analyzed the voice A01 as "some sort of request utterance regarding the weather". In other words, the model M03 is a model in which the granularity of the answer is coarse, the utterance of the user is processed by connection of fewer words, and the interaction with the user can be performed more stably.

The model M02 is a model having a medium noise resistance, and the setting of semantic analysis is set to a middle level between the model M01 and the model M03.

For example, the model M02 is a model that outputs, for example, "WEATHER-CHECK" to the voice A01. Such a domain goal indicates a meaning that the response generation device 10 has analyzed the voice A01 as "request utterance regarding weather check". In other words, the model M02 is a model in which the granularity of the answer is medium, the utterance of the user is processed by connection of a medium amount of words, and naturalness of the response to be generated and stability of the interaction are harmonized.

The response generation device 10 selects one of the three types of models according to the noise level of the voice A01. For example, when determining that the noise level is medium, the response generation device 10 selects the model M02.

Then, the response generation device 10 generates a response to the voice A01 on the basis of the model M02 (step S3). For example, the response generation device 10 generates a response A02 including contents such as "tomorrow's weather is . . . " and outputs the response A02 to the user.

In the example of FIG. 1, as a more natural response, the response generation device 10 desirably generates a response based on the voice A01 such as "it is likely to be fine tomorrow". However, in order to generate this response, it is necessary to analyze the voice A01 in detail as in "WEATHER-CHECK-SUNNY" described above. For example, it is conceivable to analyze the voice A01 using a feature having a large number of required elements such as 3-grams. For this reason, for example, in a case where a part such as "will it be fine" cannot be recognized due to the influence of noise, there is a possibility that asking back to the user occurs. On the other hand, by selecting the model M02 or the model M03 resistant to noise, the response generation device 10 can generate the response A02 to the user even in a case where, for example, only a part such as "tomorrow's weather" in the voice A01 can be heard. As described above, the response generation device 10 selects a model in accordance with the influence of noise or the like in the acquired voice A01, and thereby it is possible to implement robust interactive processing with high stability with respect to the utterance of the user.

Note that although an example in which noise is mixed in the voice A01 is illustrated in the example of FIG. 1, the response generation device 10 may select a model according to an index value of non-sentence level such as a grammatical error of the voice A01, or the like, a context (situation) in which the voice A01 is uttered, or the like, in addition to the noise. These examples will be described in detail below in FIG. 2.

1-2. Configuration of Response Generation System According to Embodiment

Figure 2:
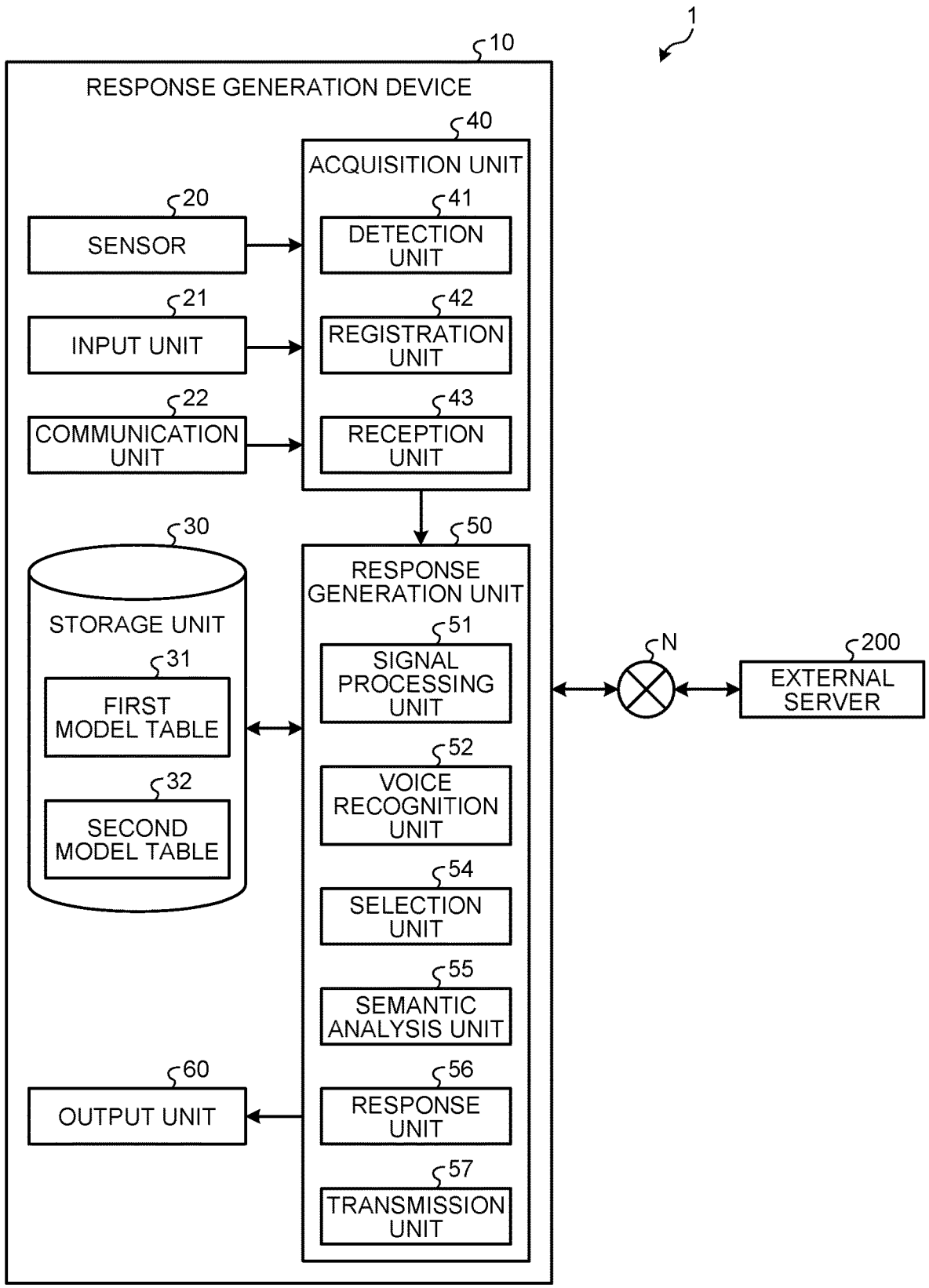
FIG. 2 is a diagram illustrating a configuration example of a response generation system according to the embodiment.

Next, a configuration of a response generation system 1 including the response generation device 10 will be described. FIG. 2 is a diagram illustrating a configuration example of the response generation system 1 according to the embodiment.

As illustrated in FIG. 2, the response generation system 1 includes the response generation device 10 and an external server 200. The response generation device 10 and the external server 200 are communicably connected in a wired or wireless manner via a network N (for example, the Internet) illustrated in FIG. 2. Note that although not illustrated in FIG. 2, the response generation system 1 may include a plurality of response generation devices 10 and external servers 200.

The external server 200 is a service server that provides various services. For example, the external server 200 provides weather information, traffic information, and the like to the response generation device 10 in accordance with a request from the response generation device 10. For example, in a case where an inquiry about weather information is made from the response generation device 10, the external server 200 returns weather information according to the date and time and place to the response generation device 10.

The response generation device 10 is an information processing terminal that executes the response generation processing according to the present disclosure. As illustrated in FIG. 2, the response generation device 10 includes a sensor 20, an input unit 21, a communication unit 22, a storage unit 30, an acquisition unit 40, a response generation unit 50, and an output unit 60.

Note that in the example of FIG. 2, the response generation device 10 is described to include the sensor 20, the input unit 21, the communication unit 22, the storage unit 30, the acquisition unit 40, the response generation unit 50, and the output unit 60 as a single device, but this is not limited to this example. For example, the external server 200 may further include the storage unit 30, the acquisition unit 40, and the response generation unit 50, and the external server 200 may be configured to be connected to a terminal device including the sensor 20, the input unit 21, the communication unit 22, and the output unit 60 via the network N. In this case, it can be considered that the terminal device and the external server 200 constitute the response generation device 10 as a whole.

The sensor 20 detects various types of information. For example, the sensor 20 includes a microphone that collects sound including a voice uttered by the user and converts the sound into a voice signal as a mode that allows executing information processing in a subsequent stage. The sensor 20 can further include a camera that acquires action of the user as a video and converts the captured video into digital data as a mode that allows executing information processing in a subsequent stage.

Furthermore, the sensor 20 may include a touch sensor that detects a touch by the user on the response generation device 10, an acceleration sensor, a gyro sensor, and the like. Further, the sensor 20 may include a sensor that detects the current position of the response generation device 10. For example, the sensor 20 may receive a radio wave transmitted from a global positioning system (GPS) satellite and detect position information (for example, latitude and longitude) indicating the current position of the response generation device 10 on the basis of the received radio wave.

Further, the sensor 20 may include a radio wave sensor that detects a radio wave emitted by an external device, an electromagnetic wave sensor that detects an electromagnetic wave, or the like. Furthermore, the sensor 20 may detect an environment in which the response generation device 10 is placed. Specifically, the sensor 20 may include an illuminance sensor that detects illuminance around the response generation device 10, a humidity sensor that detects humidity around the response generation device 10, a geomagnetic sensor that detects a magnetic field at the position of the response generation device 10, and the like.

The input unit 21 is a device for receiving various operations from the user. For example, the input unit 21 is achieved by a keyboard, a mouse, a touch panel, or the like.

The communication unit 22 is achieved by, for example, a network interface card (NIC) or the like. The communication unit 22 is connected to the network N in a wired or wireless manner, and transmits and receives information to and from the external server 200 or the like via the network N.

The storage unit 30 is achieved by, for example, a semiconductor memory element such as a random access memory (RAM) or a flash memory, or a storage device such as a hard disk or an optical disk. The storage unit 30 has a first model table 31 and a second model table 32. Hereinafter, the data tables will be described in order.

The first model table 31 is a data table that retains a first rule used by the response generation device 10 when selecting a model. Note that the first rule in the embodiment is a rule for selecting a model according to a noise level of a voice acquired from the user. FIG. 3 illustrates an example of the first model table 31 according to the embodiment.

FIG. 3 is a diagram illustrating an example of the first model table 31 according to the embodiment. In the example illustrated in FIG. 3, the first model table 31 includes items such as "model ID", "noise resistance", and "application condition". Further, the item "application condition" has a sub-item such as "SN ratio".

The "model ID" indicates identification information for identifying the model. Note that in the present description, the identification information may be used as a reference sign. For example, a model with the model ID "M01" indicates the model M01. The "noise resistance" indicates the noise resistance of the model. The "application condition" indicates a condition under which the model is applied (selected) for semantic analysis. The "SN ratio" indicates an SN ratio of a voice acquired from the user. The unit of the SN ratio is, for example, decibels (dB).

Specifically, the example illustrated in FIG. 3 indicates that the model M01 identified by the model ID "M01" is selected when the noise resistance is "low" and the SN ratio of the voice is from the lower limit of 30 dB to the upper limit of 60 dB. Further, the model M02 indicates that the noise resistance is "medium", and the model is selected when the SN ratio of the voice is from the lower limit of 10 dB to the upper limit of 30 dB. Further, the model M03 indicates that the noise resistance is "high", and the model is selected when the SN ratio of the voice is from the lower limit of −5 dB to the upper limit of 10 dB.

Next, the second model table 32 will be described. The second model table 32 is a data table that retains a second rule used by the response generation device 10 when selecting a model. Note that the second rule in the embodiment is a rule for selecting a model according to whether or not a voice acquired from the user is more textual, such as non-sentence level. FIG. 4 illustrates an example of the second model table 32 according to the embodiment. FIG. 4 is a diagram illustrating an example of the second model table 32 according to the embodiment. In the example illustrated in FIG. 4, the second model table 32 includes items such as "model ID", "noise resistance", and "application condition". Further, the item of "application condition" has sub-items such as "non-sentence level", "language model matching", and "grammar model matching".

The "model ID", the "noise resistance", and the "application condition" correspond to the same items illustrated in FIG. 3.

The "non-sentence level" indicates an index value indicating non-sentence likelihood of a voice of the user. The "language model matching" indicates an index value with which a voice of the user matches a predetermined language model. The "grammar model matching" indicates an index value with which a voice of the user matches a predetermined grammar model. Note that the difference between the language model matching and the grammar model matching is whether or not the word is classified on the basis of a part of speech or the like. In the example illustrated in FIG. 4, the items such as the non-sentence level are conceptually described as "B01", "C01", and "D01", but in practice, a specific value (for example, a value indicating an upper limit and a lower limit that are conditions under which the model is selected) such as an index value (score) indicating a non-sentence level when a voice acquired from the user is subjected to the text analysis is stored in the items such as the non-sentence level. Note that various known techniques may be used to calculate index values of the non-sentence level, the language model matching, the grammar model matching, and the like. Further, the application condition of the non-sentence level or the like may not condition the numerical value of each item but may be determined by a statistical value or the like of the index value of each of the non-sentence level, the language model matching, and the grammar model matching.

For example, the noise resistance being "high" in the non-sentence level or the like is a model that can generate some kind of response to the user by the above-described information processing of semantic analysis or adjustment of dictionary data even if the voice or text acquired from the user does not seem to be a sentence or is not grammatically correct, and the noise resistance being "low" in the non-sentence level or the like is a model that can generate a more natural response to the user when the voice or text acquired from the user is an appropriate sentence or grammatically correct.

That is, the example illustrated in FIG. 4 indicates that the model M11 is selected in a case where the noise resistance is "low", the non-sentence level is "B01", the language model matching is "C01", and the grammar model matching is "D01". Further, the model M12 indicates that it is selected when the noise resistance is "medium", the non-sentence level is "B02", the language model matching is "C02", and the grammar model matching is "D02". Furthermore, the model M13 indicates that it is selected when the noise resistance is "high", the non-sentence level is "B03", the language model matching is "C03", and the grammar model matching is "D03".

Returning to FIG. 2, the description will be continued. The acquisition unit 40 and the response generation unit 50 are processing units that execute information processing executed by the response generation device 10. The acquisition unit 40 and the response generation unit 50 are implemented by, for example, a central processing unit (CPU), a micro processing unit (MPU), a graphics processing unit (GPU), or the like executing a program (for example, a response generation program for executing response generation processing according to the present disclosure) stored inside the response generation device 10 with a random access memory (RAM) or the like being a work area. Further, the acquisition unit 40 and the response generation unit 50 are controllers, and may be achieved by, for example, an integrated circuit such as an application specific integrated circuit (ASIC) or a field programmable gate array (FPGA).

The acquisition unit 40 is a processing unit that acquires various types of information. As illustrated in FIG. 2, the acquisition unit 40 includes a detection unit 41, a registration unit 42, and a reception unit 43.

The detection unit 41 detects various types of information via the sensor 20. For example, the detection unit 41 detects a voice signal based on a voice uttered by the user via a microphone which is an example of the sensor 20. Furthermore, the detection unit 41 may detect various types of information regarding motion of the user, such as face information of the user, and orientation, inclination, movement, moving speed, and the like of the body of the user via a camera, an acceleration sensor, an infrared sensor, and/or the like. That is, the detection unit 41 may detect various physical quantities such as position information, acceleration, temperature, gravity, rotation (angular velocity), illuminance, geomagnetism, pressure, proximity, humidity, and rotation vector as context information via the sensor 20.

The registration unit 42 receives registration from the user via the input unit 21. For example, the registration unit 42 accepts registration of a user profile (attribute information) of a user who uses the response generation device 10 via a touch panel or a keyboard.

Further, the registration unit 42 may register various types of information such as a model to be used for interactive processing with the user and an application condition to be used for selection of the model in the storage unit 30. For example, the registration unit 42 acquires information of the model and the application condition of the model via an input by the user, a cloud server that controls the interactive processing of the response generation device 10, or the like, and registers the acquired information.

Further, the registration unit 42 may receive registration of a schedule or the like of the user. For example, the registration unit 42 receives schedule registration from the user using an application function incorporated in the response generation device 10. For example, the registration unit 42 registers, in the storage unit 30, schedule information such as setting of an alarm and scheduled going out requested by the user through an interaction with the user.

The reception unit 43 receives various types of information. For example, in a case where the attribute information or the schedule information of the user is registered not in the response generation device 10 but in an external service or the like, the reception unit 43 receives the attribute information, the schedule, or the like of the user from the external server 200.

Further, the reception unit 43 may receive context information regarding communication. For example, the reception unit 43 may receive a connection status between the response generation device 10 and various devices (server on a network, home appliance in home, and the like) as the context information. The connection status with various devices is, for example, information indicating whether or not mutual communication is established, a communication standard used for communication, an effective band of communication, and the like.

The acquisition unit 40 acquires various types of information by controlling the above-described processing units. For example, the acquisition unit 40 acquires input information that triggers generation of a response to the user.

For example, the acquisition unit 40 acquires voice information uttered by the user as the input information. Specifically, the acquisition unit 40 acquires an utterance of the user such as "will it be fine tomorrow?", and acquires a character string (text information) included in the utterance or some intention included in the utterance as the input information.

Alternatively, the acquisition unit 40 may acquire detection information in which an action of the user is detected as the input information. The detection information is information detected by the detection unit 41 via the sensor 20. Specifically, the detection information is an action of the user that can trigger the response generation device 10 to generate a response, such as information indicating that the user has looked at the camera of the response generation device 10 or information indicating that the user has moved from the room of the home to the entrance.

Moreover, the acquisition unit 40 may acquire, as the input information, a character string (text) received via the input unit 21 and input by the user. Furthermore, the acquisition unit 40 may acquire a character string received from the outside via the communication unit 22 as the input information.

Further, the acquisition unit 40 may acquire, together with the input information, context information when the input information is input.

For example, the acquisition unit 40 may acquire the context information of the user on the basis of information input by the user in the past before the input information or content of a response output to the user in the past. In other words, the acquisition unit 40 acquires information indicating a context such as what state is the user in and/or what field (domain) of interaction the user desires on the basis of the content of a past interaction with the user or a past response generated for the user.

Further, the acquisition unit 40 may acquire the context information of the user on the basis of a place where the user is located, a date and time when the input information has been input to the response generation device 10, attribute information of the user, or schedule information of the user.

Further, the acquisition unit 40 may acquire information such as the number of other users located near the user, a location, a category of the location (home, outdoors, or the like), and a vehicle (train, subway, Shinkansen, packed train (degree of congestion), car, ship, airplane) on which the user is riding. The acquisition unit 40 acquires these pieces of information using, for example, a voice recognition model or the like that determines background noise or the like in a vehicle on which the user rides. Alternatively, the acquisition unit 40 may acquire these pieces of information on the basis of position information or the like acquired from a terminal used by the user.

Further, the acquisition unit 40 may acquire attribute information such as age and gender of the user (speaker). For example, the acquisition unit 40 may acquire the attribute information of the user registered in advance by the user. The acquisition unit 40 acquires, for example, information such as gender, age, and residential place of the user. Note that the acquisition unit 40 may acquire the attribute information of the user by recognizing an image captured by the sensor 20.

Further, the acquisition unit 40 may acquire the action state of the user. The action state of the user is information indicating a state such as whether the user is standing or sitting, sleeping, walking or running, or making a call or talking with another user. Furthermore, the acquisition unit 40 may acquire various types of information such as the health state of the user and whether or not the user who has uttered is a user registered in the response generation device 10.

Furthermore, the acquisition unit 40 may acquire the context information on the basis of a character string input by the user and received by the input unit 21.

Note that the context information described above is an example, and any information indicating a situation in which the user or the response generation device 10 is placed can be context information. For example, the acquisition unit 40 may acquire various physical quantities such as position information, acceleration, temperature, gravity, rotation (angular velocity), illuminance, geomagnetism, pressure, proximity, humidity, and rotation vector of the response generation device 10 acquired via the sensor 20 as context information. Further, the acquisition unit 40 may acquire a connection status (for example, information related to establishment of communication, a communication standard used, and an effective band of communication) with various devices and the like as the context information using a built-in communication function.

Further, the context information may include information regarding an interaction between the user and another user or between the user and the response generation device 10. For example, the context information may include interaction context information indicating the context of an interaction that the user has, a domain of the interaction (weather, news, train operation information, and the like), an intent and attribute information of the user utterance, and the like.

Further, the context information may include date and time information when an interaction is being performed. Specifically, the date and time information is information such as date, time, day of the week, holiday characteristics (such as Christmas), and time zone (morning, daytime, night, and midnight).

Further, the context information may include information such as a position and a situation where the user is located. Specifically, the information indicating the position of the user is information indicating a position where the user is located, such as whether the user is in the living room, a bedroom, or a children's room in the home. Alternatively, the information indicating the position where the user is located may include information on a specific place indicating a place where the user is visiting. For example, the acquisition unit 40 acquires these pieces of information by communicating with a mobile terminal such as a smartphone owned by the user.

Further, the context information may include information regarding a situation or emotion estimated from an action of the user. For example, in a case of detecting that the moving speed of the user is faster than usual, the acquisition unit 40 acquires context information of "user is in a hurry".

Further, the acquisition unit 40 may acquire, as the context information, various types of information indicating the situation of the user, such as information regarding specific housework that the user is doing, content of a TV program that the user is viewing, information indicating what the user is eating, and having a conversation with a specific person.

Further, the acquisition unit 40 may acquire information such as which home appliance is active (for example, whether or not the power source is on or off) and which home appliance is executing what kind of processing by mutual communication with a home appliance (IoT device or the like) placed in the house.

Further, the acquisition unit 40 may acquire traffic conditions, weather information, and the like in the living area of the user as context information by mutual communication with an external service. The acquisition unit 40 stores each acquired information in the storage unit 30. Furthermore, the acquisition unit 40 may refer to the storage unit 30 and appropriately acquire information required for processing.

Next, the response generation unit 50 will be described. As illustrated in FIG. 2, the response generation unit 50 includes a signal processing unit 51, a voice recognition unit 52, a selection unit 54, a semantic analysis unit 55, a response unit 56, and a transmission unit 57. The response generation unit 50 controls each of the above processing units to generate a response to the user with the acquisition of the input information by the acquisition unit 40 being a trigger, and executes the interactive processing with the user.

The signal processing unit 51 performs signal processing related to input information such as an utterance of the user. As a more specific example, in a case where the input information is a voice signal, the signal processing unit 51 performs sound source separation processing of utterance and environmental sound on the basis of the voice signal acquired by the acquisition unit 40. Further, the signal processing unit 51 performs noise reduction processing on the voice signal of the separated utterance portion, for example. Furthermore, the signal processing unit 51 estimates a noise level (SN ratio) of the voice signal acquired by the acquisition unit 40.

The voice recognition unit 52 recognizes a voice from the voice signal processed by the signal processing unit 51. The voice recognition unit 52 recognizes a voice from the voice signal by using, for example, automatic speech recognition (ASR) processing. Further, the voice recognition unit 52 estimates reliability of the recognized voice information. Furthermore, the voice recognition unit 52 analyzes the recognized voice information, and estimates the non-sentence level or the like of a character string corresponding to the voice information on the basis of the analysis result.

The selection unit 54 selects a model for generating a response to the input information on the basis of each piece of information (noise level, reliability of voice information, non-sentence level of character string corresponding to voice information, and the like) estimated by each of the signal processing unit 51 and the voice recognition unit 52. For example, the selection unit 54 refers to the rules retained in the first model table 31 and the second model table 32, and selects the model to be used for generating the response on the basis of meaning of words included in the input information, noise level in an analysis result of the input information, and the like.

The semantic analysis unit 55 performs the semantic analysis processing on the input information. For example, the semantic analysis unit 55 analyzes the intention and meaning included in the input information using the model selected by the selection unit 54, and outputs analyzed information to the response unit 56. Further, the semantic analysis unit 55 performs processing of estimating reliability with respect to an analysis result of the intention and meaning included in the input information.

As an example, the semantic analysis unit 55 analyzes the intention and meaning included in the input information, for example, using natural language understanding (NLU) processing. The semantic analysis unit 55 estimates information (domain goal) indicating in which field the utterance of the user corresponds to an interaction by analysis based on the input information. For example, the semantic analysis unit 55 decomposes the voice recognized by the voice recognition unit 52 into morphemes, and estimates a domain goal of the interaction on the basis of a result of determining what kind of intention or attribute each morpheme has. Further, the semantic analysis unit 55 determines the importance of an input character string for estimation. For analysis based on the input information, the semantic analysis unit 55 can use various known techniques such as phrase extraction and slot analysis in interaction.

The response unit 56 generates a response to the input information on the basis of the analysis result of the input information by the semantic analysis unit 55.

The transmission unit 57 controls output of the response generated by the response unit 56. For example, the transmission unit 57 converts the response including a character string generated by the response unit 56 into voice data. Alternatively, the transmission unit 57 converts the response accompanied by image information generated by the response unit 56 into image data.

The output unit 60 is a mechanism for outputting various types of information. For example, the output unit 60 is a speaker or a display. For example, the output unit 60 audio-outputs the voice data generated by the response unit 56. Further, the output unit 60 causes the display to display the character string generated as a response by the response unit 56. Further, the output unit 60 outputs the image data generated by the response unit 56 to the display. Not limited to this, the output unit 60 may output the response in various modes such as recognizing characters of the voice data generated by the response unit 56 and displaying the characters on the display.

The response generation unit 50 generates a response corresponding to the input information by controlling each of the above-described processing units. That is, the response generation unit 50 selects a model to be used in generating a response corresponding to the input information on the basis of the analysis result of the input information, and generates a response to the user using the selected model.

Specifically, the response generation unit 50 selects the model on the basis of a signal-to-noise ratio (SN ratio) in the voice information. For example, as preprocessing, the response generation unit 50 decomposes an input signal of voice or the like into frames and subjects the frames to Fourier transform to obtain a spectrum for each frame. Thereafter, the response generation unit 50 detects a non-voice section using voice section detection (voice activity detection (VAD)), averages the spectra for a predetermined number of frames (for example, 16 or the like) in the non-voice section, and estimates the noise spectrum. Note that, in a case where a voice existence probability can be estimated, the response generation unit 50 can update the estimated noise spectrum also in the voice activity period by using a coefficient calculated using the voice existence probability (the coefficient is, for example, 1-p when the voice existence probability is p) as a weight for averaging. Subsequently, the response generation unit 50 estimates a signal spectrum from the spectrum and a latest estimated noise spectrum. Then, the response generation unit 50 can calculate (estimate) the SN ratio in the input signal from the latest estimated noise spectrum and the estimated signal spectrum. Note that the above estimation technique is an example, and the response generation unit 50 may use any of various known SN ratio estimation algorithms.

For example, in a case where the SN ratio of the input information is high, that is, in a case where the noise level is low, the response generation unit 50 selects a model with "low" noise resistance. On the other hand, in a case where the SN ratio of the input information is low, that is, in a case where the noise level is high, the response generation unit 50 selects a model with "high" noise resistance. Specifically, the response generation unit 50 refers to the application condition of the noise level stored in the first model table 31 and selects a model to be applied to the utterance of the user.

Note that the response generation unit 50 may use not only the SN ratio but also a known index value such as an estimated value of a word error rate (WER) in voice recognition.

Further, the response generation unit 50 may select a model on the basis of a non-sentence level when the voice information is converted into a character string. For example, the response generation unit 50 uses a known model for non-sentence level determination to calculate the non-sentence level when the voice information is converted into a character string. Note that the response generation unit 50 may score the appropriateness (sentence likelihood) of the input information using not only the model for non-sentence level determination but also a known language model, a known grammar model, or the like.

For example, in a case where the non-sentence level of the character string is high, that is, in a case where the sentence likelihood of the character string is low, the response generation unit 50 selects the model with "high" noise resistance. On the other hand, in a case where the non-sentence level of the character string is low, that is, in a case where the sentence likelihood of the character string is high, the response generation unit 50 selects the model with "low" noise resistance. Specifically, the response generation unit 50 selects a model to be applied to the utterance of the user with reference to the application condition such as non-sentence level stored in the second model table 32.

Note that the response generation unit 50 can also obtain the non-sentence level of the character string input by the user and acquired as the input information, and select the model on the basis of the non-sentence level.

Further, the response generation unit 50 may select a plurality of the models on the basis of the analysis result of the input information, and generate a response to the user on the basis of output results output from the selected plurality of the models. That is, the response generation unit 50 may select a plurality of models instead of selecting only one model, and generate a response to be actually output on the basis of responses output from the plurality of models. In this case, the response generation unit 50 may use all the models satisfying an application condition for semantic analysis, take an average of outputs of the models, and generate a response to be actually output. Alternatively, the response generation unit 50 may take a weighted average of outputs of the models and generate a response to be actually output.

As described above, the model conceptually indicates information processing used for semantic analysis, and each model is prescribed by features used for a response, an algorithm of response generation, a corpus or dictionary used for processing, a method of using the corpus or dictionary data, or the like.

For example, the response generation unit 50 selects a model according to an analysis result from a plurality of models having different numbers of connected words used for semantic analysis of the input information. As described above, in the model, the possibility of being capable of making a more human-like appropriate response increases as the number of connected words (N-gram analysis) used for semantic analysis of the input information increases, but the influence of noise tends to increase accordingly. On the other hand, in the model, as the number of connected words used for semantic analysis of the input information decreases, it becomes more difficult to increase the level of detail of the analysis, but a robust response becomes possible. The response generation unit 50 can implement robust interactive processing, for example, by using a model in which the number of connected words is large (or small) in the noise level.

Further, the response generation unit 50 may select a model according to the analysis result from a plurality of models having different noise levels applied to a corpus used for semantic analysis of the input information. For example, in a case where the noise level of the input information is high, the response generation unit 50 may select a model that uses a corpus to which noise is intentionally added. Furthermore, in a case where the noise level of the input information is low, the response generation unit 50 may select a model using a corpus learned in a clean environment (a state without noise).

Further, the response generation unit 50 may select a model according to the analysis result from a plurality of models having different usage modes of dictionary data used for semantic analysis of the input information. More specifically, the response generation unit 50 may select a model according to the analysis result from a plurality of models having different determination granularities of homonyms in the dictionary data.

For example, in a case where the input information has a high non-sentence level, the response generation unit 50 may select a model using dictionary data in which determination of homonyms is relatively loose. For example, the use of dictionary data in which determination of homonyms is relatively loose refers to, for example, processing in which even in a case where voice recognition is performed such that "Tenki (weather)" uttered by the user is recognized as "Tenki (turning point)", both are intentionally regarded as the same. In this case, for example, even in a case where the response generation unit 50 erroneously recognizes that the user has uttered "tell me Tenki (turning point)", the response generation unit 50 can output some sort of response such as "tomorrow's Tenki (weather) is . . . " instead of performing ascertainment such as "I don't understand the meaning". In other words, such processing causes a difference as to whether the response generation unit 50 determines, for the utterance "tell me Tenki (turning point)", that the domain determination is impossible (OOD, out-of-Domain) or determines to be in the domain of the weather information (WEATHER-CHECK).

In the above description, the response generation unit 50 is described to select a model according to the analysis result on the basis of the number of connected words, but this is not limited to this example. For example, in the above-described word-based N-gram analysis, the response generation unit 50 can also select a model according to the analysis result from a plurality of models having different maximum numbers of words on which features used for semantic analysis of the input information depend. Here, "maximum" means to use 1-gram analysis or 2-gram analysis even in a model having low noise resistance and using up to 3-gram analysis, for example. Not limited to this, when character-based N-gram analysis is performed, a model according to the analysis result can be selected from a plurality of models having different maximum numbers of characters on which features depend. The meaning of "maximum" is similar to that in the case of the word-based N-gram analysis, and thus the description thereof is omitted here.

Further, the response generation unit 50 may calculate reliability of the model selected for the input information or a response generated by the model on the basis of the analysis result of the input information.

For example, the response generation unit 50 calculates the reliability on the basis of the SN ratio in a portion of the input information used in determining the response field (domain goal) to the input information. For example, it is known that specific words such as "weather" and "tell me" strongly influence the determination of the domain goal of the weather information. On the other hand, in the determination of the domain goal of the weather information, words such as "tomorrow" and "Tokyo" are known to have a weaker influence than the above words. Therefore, in the determination of the domain goal in a case where the user utters "tell me the weather in Tokyo tomorrow", if the SN ratio of the voice signal of the portion corresponding to "weather" and the SN ratio of the voice signal of the portion corresponding to "tomorrow" are equally treated, there is a possibility that the domain goal determination is not appropriately performed. Specifically, even when the SN ratio of the voice signal of the portion corresponding to "tomorrow" is low, if the SN ratio of the voice signal of the portion corresponding to "weather" is high, it is likely to be appropriate to determine the domain goal of the utterance as "weather information".

In this manner, the response generation unit 50 calculates the reliability of the selected domain goal, the selected model, or the response output to the user on the basis of the SN ratio in the portion of the input information used in determining the domain goal, and thus the reliability of the selection can be calculated with high accuracy.

Further, the response generation unit 50 may output the calculated reliability to an external service used in generating a response. For example, the response generation unit 50 can make an application or the like provided by each service operate better by causing an external service to use the information of the reliability output by the semantic analysis.

As an example, the response generation unit 50 can determine an execution risk regarding the response generated for the user on the basis of the calculated reliability.

It is assumed that the response generation unit 50 estimates a domain goal of "making remittance" on the basis of an interaction of the user. At this time, in a case where the reliability of the domain goal estimated by the response generation unit 50 is relatively low, the response generation unit 50 determines that an execution risk regarding the response generated for the user is high. The external service (for example, a business operator that provides a remittance service) that has received such information can change the mode of the information processing on the basis of the reliability and the execution risk transmitted from the response generation unit 50. For example, the external service provides a processing step for confirmation, such as "may I remit money to?". On the other hand, in a case where the response generation unit 50 determines that the execution risk is low (the reliability is high), the external service may omit the processing step of confirmation and perform the remittance processing according to a request of the user.

Thus, for example, in a case where it is difficult to hear an utterance from the user and there is a high possibility that the domain service selected by the response generation unit 50 or an instruction of the user includes an error, the response generation unit 50 can prevent erroneous information from being presented to the user or the service from executing erroneous information processing. In other words, even in a case where the user has made an utterance that is difficult to hear, the response generation unit 50 can confirm whether processing as intended by the user is being executed by calculating the reliability and performing information processing based on the calculated reliability.

Note that the determination of the reliability and the execution risk may be set differently for each domain goal or service. For example, the reliability and the execution risk are required to be higher than a predetermined threshold for the process of "remittance", whereas the thresholds of the reliability and the execution risk do not need to be provided for the process of "weather information".

Further, as a result of the semantic analysis processing, the response generation unit 50 may output not only the reliability but also information such as a dialect used by the user, the age, gender, or the like of the user. Furthermore, the response generation unit 50 may output results of features, weights thereof, and the like used in the semantic analysis processing.

Further, the response generation unit 50 may set predetermined meta-information for each domain goal. For example, the response generation unit 50 may set meta-information "transfer fraud degree" for the domain goal "remittance". In this case, for example, the response generation unit 50 acquires information such as "what the user was doing before the utterance instructing remittance", and calculates the score of the meta-information to be relatively high in a case where transfer fraud or the like is suspected in the utterance from the acquired content. In this case, the response generation unit 50 may transmit the result of the meta-information to an external service or the like, for example. Thus, the response generation unit 50 can provide an action or the like suspicious of the utterance or the like of the user to an external service or the like in advance.

1-3. Procedure of Information Processing According to Embodiment

Figure 5:
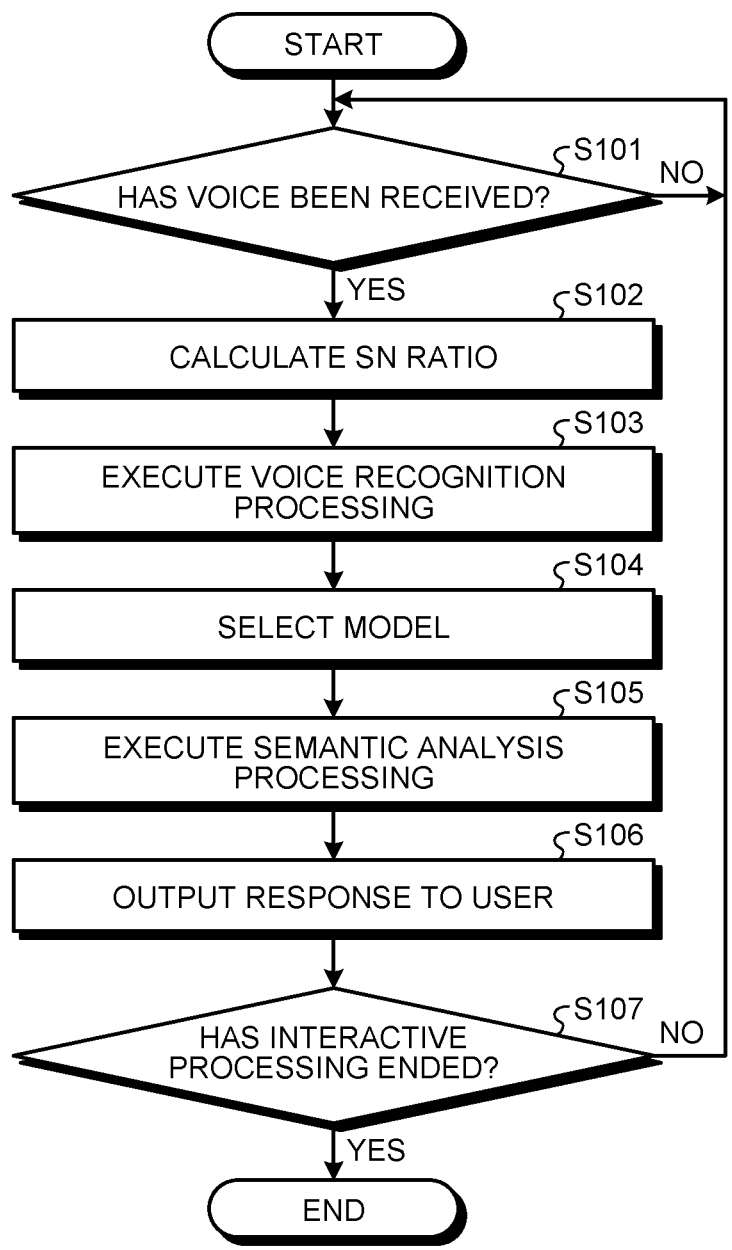
FIG. 5 is a first flowchart illustrating a flow of processing according to the embodiment.

Next, a procedure of information processing according to the embodiment will be described with reference to FIGS. 5 and 6. FIG. 5 is a first flowchart illustrating a flow of processing according to the embodiment. In FIG. 5, a flow of processing in a case where the response generation device 10 selects a model on the basis of the SN ratio of a voice of the user will be described.

As illustrated in FIG. 5, the response generation device 10 determines whether or not a voice of the user has been received (step S101). When no voice has been received (step S101; No), the response generation device 10 waits until receiving a voice.

On the other hand, when a voice has been received (step S101; Yes), the response generation device 10 calculates the SN ratio of the voice (step S102). Subsequently, the response generation device 10 executes the voice recognition processing (step S103). Furthermore, the response generation device 10 selects a model on the basis of the SN ratio of the voice (step S104).

Subsequently, the response generation device 10 executes the semantic analysis processing using the selected model (step S105). Then, the response generation device 10 generates a response for the user and outputs the generated response (step S106).

Thereafter, the response generation device 10 determines whether or not the interactive processing with the user has ended (step S107). Specifically, the response generation device 10 determines whether or not one session related to the interaction with the user has ended.

When the interactive processing has not ended (step S107; No), the response generation device 10 returns the processing to step S101 and continues the interactive processing. On the other hand, when it is determined that the interactive processing has ended (step S107; Yes), the response generation device 10 ends the processing.

Next, a flow of processing in a case where the response generation device 10 selects a model on the basis of the non-sentence level of a voice of the user will be described with reference to FIG. 6. FIG. 6 is a second flowchart illustrating a flow of processing according to the embodiment.

Figure 6:
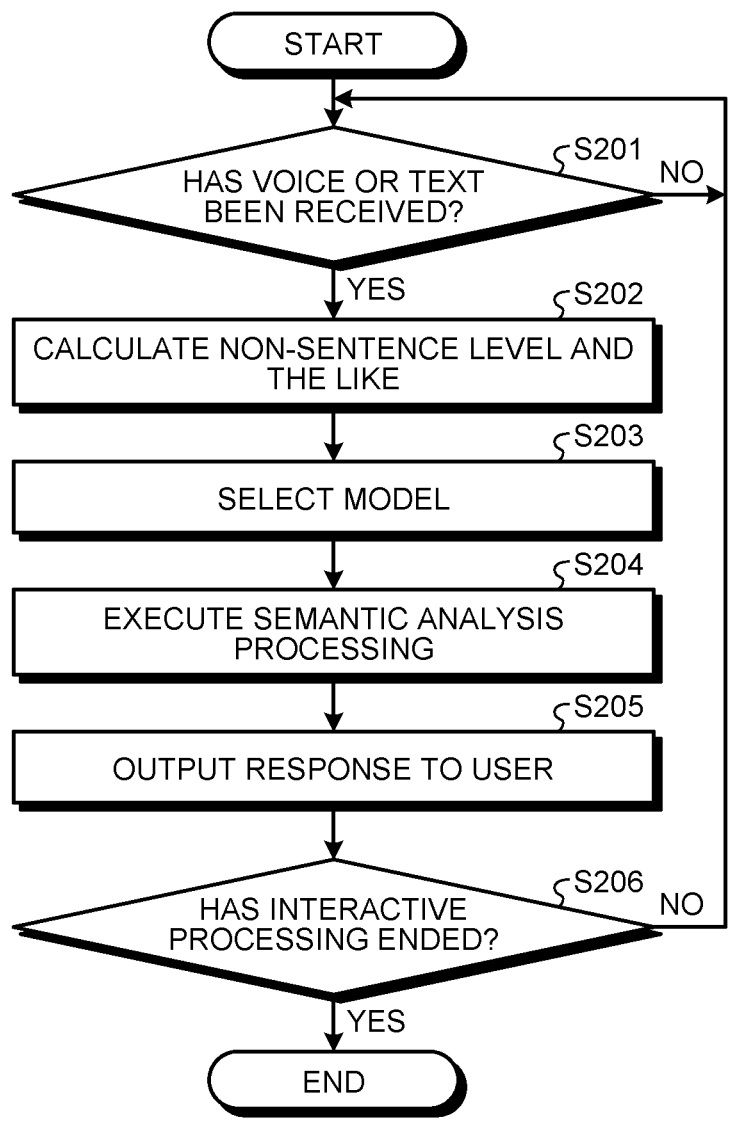
FIG. 6 is a second flowchart illustrating a flow of processing according to the embodiment.

As illustrated in FIG. 6, the response generation device 10 determines whether or not the voice of the user or a text input from the user is received (step S201). When no voice or text is received (step S201; No), the response generation device 10 waits until a voice or text is received.

On the other hand, when the voice or the text is received (step S201; Yes), the response generation device 10 calculates the non-sentence level of the voice or the text (step S202). Subsequently, the response generation device 10 selects a model on the basis of the calculated non-sentence level (step S203). Note that in a case where the voice has been received, the response generation device 10 executes the voice recognition processing on the voice between step S201 and step S202, and calculates a non-sentence level for the text of a voice recognition result.

Subsequently, the response generation device 10 executes the semantic analysis processing using the selected model (step S204). Then, the response generation device 10 generates a response for the user and outputs the generated response (step S205).

Thereafter, the response generation device 10 determines whether or not the interactive processing with the user has ended (step S206). When the interactive processing has not ended (step S206; No), the response generation device 10 returns the processing to step S201 and continues the interactive processing. On the other hand, when it is determined that the interactive processing has ended (step S206; Yes), the response generation device 10 ends the processing.

1-4. Modification Example According to Embodiment

The response generation processing according to the embodiment described above may be accompanied by various modifications. Hereinafter, modification examples of the embodiment will be described.

[1-4-1. Model Selection Using Content Information]

While the example has been described in the above embodiment in which the response generation device 10 selects a model on the basis of the SN ratio and the non-sentence level, the response generation device 10 may select a model by combining various elements, not limited to the SN ratio and the non-sentence level. Further, the model may correspond to an interaction in a specific field (domain) in advance.

For example, the response generation device 10 according to the modification example acquires, together with the input information, context information when the input information is input, and selects the model on the basis of the analysis result of the input information and the context information. Note that, in the modification example, the context information is information such as a field (domain) of interaction estimated from a situation, a slot in interaction, or the like, as described later.

For example, the response generation device 10 acquires the context information of the user on the basis of information input from the user in the past before the input information or content of a response output to the user in the past.

That is, the response generation device 10 acquires the context information of the user on the basis of the past interaction information with the user.

Further, the response generation device 10 may acquire the context information of the user on the basis of a place where the user is located, a date and time when the input information is input, attribute information of the user, or schedule information of the user.

As described above, the response generation device 10 acquires the context information on the basis of various types of information such as an interaction with the user before the input information is input, and selects the model on the basis of the acquired context information. In other words, the response generation device 10 selects modes of information processing, dictionary data, and the like used for the response so as to follow the acquired context information.

It is assumed that the user utters "tell me about the weather". At this time, if the last interaction between the response generation device 10 and the user relates to content having the name "tell me about the weather" (for example, the title of a musical piece, or the like), the response generation device 10 can determine that this utterance is not asking for "weather information" by the user but is an utterance related to the title. That is, the response generation device 10 does not select a model related to the domain called weather information, but selects another model and interacts with the user.

Thus, the response generation device 10 can accurately determine the interaction, for example, even when the SN ratio of the utterance of the user is poor or the state of communication with the response generation device 10 is poor. For example, even in a case where the non-sentence level of the utterance of the user is high, the response generation device 10 can generate some response regardless of the non-sentence level because the utterance does not relate to "weather information" but is in the domain related to art such as music.

Note that the information that can be an element for the response generation device 10 to acquire the context information is not limited to the above ones. For example, the response generation device 10 may acquire the context information of the user on the basis of various types of information that can be acquired via the sensor 20.

For example, the response generation device 10 may acquire various types of information such as information regarding a hometown or dialect of the speaker, a feeling of the speaker (whether or not the speaker is angry, or the like), a physical state of the speaker (a state in which the speaker is out of breath, or the like), and a linguistic system (for example, whether or not the speaker is an infant and is speaking infant language, or the like) of the speaker.

Processing in which the response generation device 10 selects a model using context information will be described with reference to FIGS. 7 to 10. FIG. 7 is a diagram illustrating an example of a model table 35 according to the first modification example. The model table 35 is stored in the storage unit 30 in advance, for example.

In the example illustrated in FIG. 7, the model table 35 includes items such as "condition ID", "application condition", "model ID", and "noise resistance". Further, the item of "application condition" includes sub-items such as "SN ratio lower limit", "context (domain)", and "context (slot)".

The "condition ID" indicates identification information for identifying a condition. The "application condition", the "model ID", and the "noise resistance" correspond to the same items illustrated in FIG. 3.

The "SN ratio lower limit" indicates a condition (lower limit) related to the SN ratio when the model is selected. The "context (domain)" indicates a domain estimated on the basis of the context acquired together with the input information. The domain estimated on the basis of the context is, for example, a domain of an interaction estimated from a past interaction history of the user, a location of the user when the input information is input, and the like. In the example of FIG. 7, the "context (domain)" being "no condition" indicates that no condition related to the domain is set in the model selection condition. Further, the "context (domain)" being "OOD" indicates that the domain estimated by the context does not correspond to, for example, any of known domain goals under the condition of model selection and is "Unknown (OOD, out-of-Domain)". Further, "context (domain)" of "WEATHER" indicates that the domain estimated by the context is "weather information" under the condition of model selection.

The "context (slot)" indicates a slot that is estimated on the basis of the context acquired together with the input information. The slot is information input to the slot in what is called slot filling. For example, the slot is information such as date and time and place in a case where the domain is weather information. The slot estimated on the basis of the context is, for example, slot information estimated from a past interaction history of the user, a location of the user when the input information is input, or the like. In the example of FIG. 7, "context (slot)" of "no condition" indicates that no condition related to the slot is set in the model selection condition.

That is, in the example illustrated in FIG. 7, the lower limit of the SN ratio is set to "30 (dB)", the context (domain) is set to "no condition", and the context (slot) is set to "no condition" as an application condition for a condition F01 identified by a condition ID "F01", and it is indicated that a "model M21" is selected as the model when these conditions are satisfied. Note that the model M21 has "low" noise resistance.

Further, as another example, a condition F03 indicates that the lower limit of the SN ratio is "30 (dB)", the context (domain) is "OOD", and the context (slot) is set to "no condition" as application conditions, and a "model M21-OOD" is selected as the model when these conditions are satisfied. Note that the "model M21-OOD" has "low" noise resistance.

Further, as another example, a condition F05 indicates that the lower limit of the SN ratio is set to "25 (dB)", the context (domain) is set to "WEATHER", and the context (slot) is set to "no condition" as application conditions, and a "model M21-WEATHER" is selected as the model when these conditions are satisfied. The "model M21-WEATHER" has "low" noise resistance.

Note that the "model M21-OOD" is a model learned to be used for the interactive processing in a case where the field of interaction is unknown on the basis of the model M21, for example. Further, the "model M21-WEATHER" is a model learned to be used for the interactive processing in a case where the field of interaction is "weather information" on the basis of the model M21, for example. Alternatively, the "model M21-WEATHER" may be, for example, a model that generates a response by slot filling on the assumption that the field of interaction is "weather information".

As illustrated in FIG. 7, the response generation device 10 may select a model by combining conditions such as an SN ratio and context information. In this case, since the response generation device 10 can generate a response using a model in which the field of interaction is specified, such as the "model M21-WEATHER", it is possible to generate a more appropriate response as compared with a case of using a model in which the field of interaction is not specified.

Next, an example of another model table will be described with reference to FIG. 8. FIG. 8 is a diagram illustrating an example of a model table 36 according to a second modification example. The model table 36 has items similar to those of the model table 35. The model table 36 is stored in the storage unit 30 in advance, for example. Note that, in the example of FIG. 8, "context (slot)" being "TARGET_PLACE" indicates that the slot is "place" under the condition of model selection.

That is, in the example illustrated in FIG. 8, a condition F15 indicates that a lower limit of the SN ratio is "20 (dB)", the context (domain) is "WEATHER", and the context (slot) is set to "TARGET_PLACE" as application conditions, and "model M21-WEATHER-TG" is selected as a model when these conditions are satisfied. Note that the "model M21-WEATHER-TG" has "low" noise resistance.

The "Model M21-WEATHER-TG" is a model that is applied only when the field of interaction is "WEATHER" and the context of the user relates to "TARGET_PLACE" (for example, a place that is a target of weather information) on the basis of the model M21, for example.

As illustrated in FIG. 8, the response generation device 10 may select a model in which a domain or a slot is set in advance as the context information. Thus, the response generation device 10 can select the model in which terms and/or content to be used for the interaction is specified, and thus can generate a more appropriate response.

Next, an example of another model table will be described with reference to FIG. 9. FIG. 9 is a diagram illustrating an example of a model table 37 according to a third modification example. The model table 37 has items similar to those of the model table 36. The model table 37 is stored in the storage unit 30 in advance, for example. Note that, in the example of FIG. 9, "context (slot)" being "NONE" indicates that the model is available only when there is no context related to the slot as a condition for model selection. Further, the "context (slot)" being "PLACE" indicates that the model is available only when the context related to the slot is "PLACE" (at least related to the location) as a condition of model selection.

That is, in the example illustrated in FIG. 9, a condition F23 indicates that the lower limit of the SN ratio is "30 (dB)", the context (domain) is "no condition", and the context (slot) is set to "NONE" as application conditions, and a "model M21-ALL-NONE" is selected as the model when these conditions are satisfied. Note that the "model M21-ALL-NONE" has "low" noise resistance.

Further, a condition F25 indicates that the lower limit of the SN ratio is "25 (dB)", the context (domain) is "no condition", and the context (slot) is set to "PLACE" as application conditions, and "model M21-ALL-PLACE" is selected as the model when these conditions are satisfied. Note that the "model M21-ALL-PLACE" has "low" noise resistance.

The "model M21-ALL-NONE" is a model that is applied only when the field of interaction is not specified and the context of the user is "NONE" (for example, information regarding the slot cannot be estimated such as not corresponding to any of known slots) on the basis of the model M21, for example.

Further, the "model M21-ALL-PLACE" is a model that is applied only in a case where the field of interaction is not specified, and the context of the user is "PLACE" (at least, information entering the slot is "place") on the basis of the model M21, for example.

As illustrated in FIG. 9, the response generation device 10 may select a model in which the context information is specified. Thus, the response generation device 10 can select the model in which terms and/or content to be used for the interaction is specified, and thus can generate a more appropriate response.

[1-4-2. Model Selection Using Reliability]

The response generation device 10 may perform processing of reselecting the model used for the semantic analysis processing using the calculated reliability. That is, in a case where the generated response is not reliable (or if the domain goal of the selected model is not appropriate), the response generation device 10 may select a model again and generate a response with higher reliability.

Figure 10:
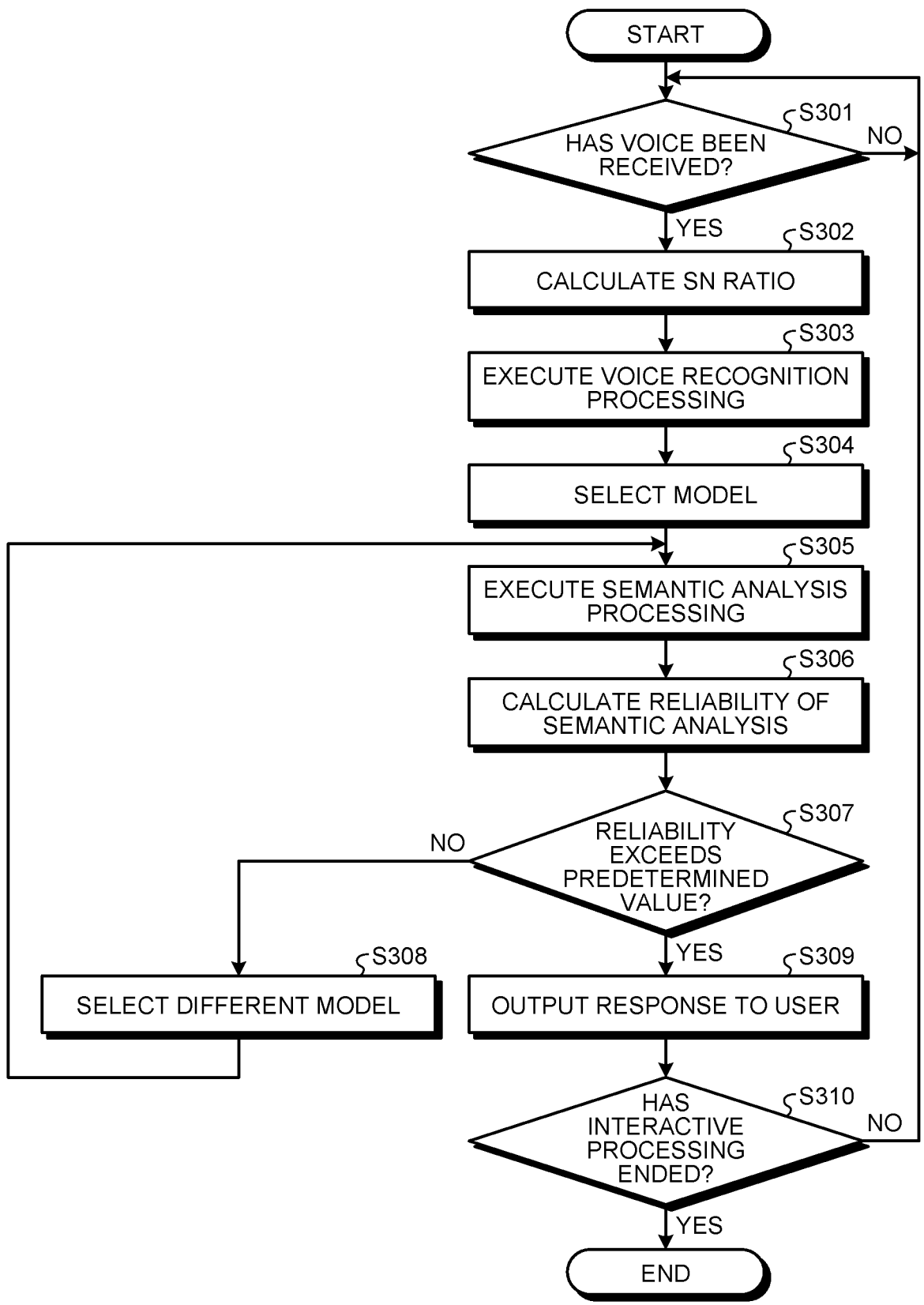
FIG. 10 is a flowchart illustrating a flow of processing according to a modification example.

In this regard, a procedure of information processing according to the modification example will be described with reference to FIG. 10. FIG. 10 is a flowchart illustrating a flow of processing according to a modification example. Note that the example of FIG. 10 illustrates an example in which the response generation device 10 selects a model on the basis of the SN ratio.

The processing from step S301 to step S305 is similar to the processing from step S101 to step S105 illustrated in FIG. 5, and thus the description thereof will be omitted.

Upon executing the semantic analysis processing, the response generation device 10 calculates the reliability with respect to the semantic analysis processing (step S306). As described above, the reliability is calculated, for example, by superimposing the SN ratio for each word used in the processing and the degree (weight) of use in the semantic analysis processing.

The response generation device 10 determines whether or not the calculated reliability exceeds a predetermined value (such as a preset threshold) (step S307). In a case where the reliability does not exceed the predetermined value (step S307; No), the response generation device 10 newly selects a model different from the model used for the semantic analysis processing (step S308). Then, the response generation device 10 executes the semantic analysis processing again (step S305).

When the reliability exceeds the predetermined value (step S307; Yes), the response generation device 10 generates a response for the user and outputs the generated response (step S309).

Thereafter, the response generation device 10 determines whether or not the interactive processing with the user has ended (step S310). When the interactive processing has not ended (step S310; No), the response generation device 10 returns the processing to step S301 and continues the interactive processing. On the other hand, when it is determined that the interactive processing has ended (step S310; Yes), the response generation device 10 ends the process.

2. Other embodiments

Among the processes described in the above embodiments, all or part of the processes described as being performed automatically can be performed manually, or all or part of the processes described as being performed manually can be performed automatically by a publicly known method. Further, the processing procedure, specific name, and information including various data and parameters illustrated in the document and the drawings can be arbitrarily changed unless otherwise specified. For example, the various types of information illustrated in each figure are not limited to the illustrated information.

Further, each component of each device illustrated in the drawings is functionally conceptual, and is not necessarily physically configured as illustrated in the drawings. That is, a specific form of distribution and integration of each device is not limited to the illustrated form, and all or a part thereof can be functionally or physically distributed and integrated in any unit according to various loads, usage conditions, and the like. For example, the semantic analysis unit 55 and the response unit 56 may be integrated. Further, the model according to the present disclosure may be a learned model learned by a method such as deep neural network (DNN). In this case, the corpus and the dictionary data described above mean learning data used for learning the model. For example, the model having high noise resistance may be a model learned by a corpus or the like to which noise is added.

Further, the above-described embodiments and modification examples can be appropriately combined within a range not contradicting processing contents.

Further, the effects described in the present description are merely examples and are not limited, and other effects may be provided.

3. Effects of Response Generation Device According to Present Disclosure

As described above, the response generation device (the response generation device 10 in the embodiment) according to the present disclosure includes the acquisition unit (the acquisition unit 40 in the embodiment) and the response generation unit (the response generation unit 50 in the embodiment). The acquisition unit acquires input information that triggers generation of a response to the user. The response generation unit selects, on the basis of an analysis result of the input information, a model to be used in generating a response corresponding to the input information and generates a response to the user using the selected model.

Thus, the response generation device according to the present disclosure can suppress occurrence of asking back or error processing with respect to information input from the user, and can achieve highly stable interactive processing.

Further, the acquisition unit acquires voice information uttered by the user as the input information. Thus, the response generation device according to the present disclosure can achieve interactive processing with high stability for the utterance of the user.

Further, the response generation unit selects the model on the basis of a signal-to-noise ratio (SN ratio) in the voice information. Thus, the response generation device according to the present disclosure can select an appropriate model according to the noise level mixed in the utterance of the user.

Further, the response generation unit selects a model on the basis of a non-sentence level when the voice information is converted into a character string. Thus, the response generation device can select an appropriate model even in a state where the utterance of the user cannot be heard as an appropriate sentence, or the like.

The acquisition unit acquires a character string input by the user as the input information. Thus, the response generation device can implement highly stable interactive processing on the character string input by the user.

Further, the response generation unit selects a model on the basis of the non-sentence level of the character string input by the user. Thus, the response generation device can select an appropriate model even in a state where the character string input by the user is not composed as an appropriate sentence, or the like.

Further, the response generation unit selects a plurality of the models on the basis of the analysis result of the input information, and generates a response to the user on the basis of output results output from the selected plurality of the models. Thus, the response generation device can generate an appropriate response according to various situations.

Further, the response generation unit selects a model according to the analysis result from a plurality of models having different maximum numbers of words on which features used for semantic analysis of the input information depend. Thus, the response generation device can improve the possibility of being capable of making a certain response to the user even in a case where the input information related to the user is incomplete.

Further, the response generation unit selects a model according to the analysis result from a plurality of models having different maximum numbers of characters on which features used for semantic analysis of the input information depend. Thus, the response generation device can improve the possibility of being capable of making a certain response to the user even in a case where the input information related to the user is incomplete.

Further, the response generation unit selects a model according to the analysis result from a plurality of models having different noise levels applied to a corpus used for semantic analysis of the input information. Thus, the response generation device can improve the possibility of being capable of making a certain response to the user even in a case where a voice mixed with noise is input.

Further, the response generation unit selects a model according to the analysis result from a plurality of models having different usage modes of dictionary data used for semantic analysis of the input information. Thus, the response generation device can improve the possibility of being capable of making a certain response to the user even when the utterance of the user is difficult to hear.

Further, the response generation unit selects a model according to the analysis result from a plurality of models having different determination granularities of homonyms in the dictionary data. Thus, the response generation device can improve the possibility of being capable of making a certain response to the user even in a case where a word with a similar pronunciation, a homonym, or the like is input.

Further, the response generation unit calculates reliability of a model selected for the input information or a response generated by the model on a basis of the analysis result of the input information. Thus, since the response generation device can self-evaluate the generated response, it is possible to learn a better response and to reselect a more appropriate model.

Further, the response generation unit calculates the reliability on the basis of a signal-to-noise ratio (SN ratio) in a portion of the input information used in determining a field of response to the input information. Thus, the response generation device can accurately calculate the reliability of the response on the basis of the index value such as the SN ratio.

Further, the response generation unit outputs the calculated reliability to an external service used in generating the response. Thus, the response generation device can provide useful information to a business operator or the like that provides services.

Further, the response generation unit determines an execution risk regarding the response generated for the user on the basis of the calculated reliability. Thus, the response generation device can perform processing such as suppressing an action that the user intends to execute in the interactive processing or issuing a warning to the user, so that the safety of the action of the user can be secured.

Further, the acquisition unit acquires, together with the input information, context information when the input information is input. The response generation unit selects a model on the basis of the analysis result of the input information and the context information. Thus, the response generation device can more appropriately select the model.

Further, the acquisition unit acquires context information of the user on the basis of information input from the user in a past before the input information or content of a response output to the user in the past. Thus, the response generation device can select a model on the basis of the interaction with the user thus far, so that accuracy of a generated response can be improved.

Further, the acquisition unit acquires the context information of the user on the basis of a place where the user is located, a date and time when the input information is input, attribute information of the user, or schedule information of the user. Thus, the response generation device can select the model to be used for the response after estimating the situation of the user on the basis of various types of information surrounding the user, and thus the accuracy of the generated response can be improved.

4. Hardware Configuration

Figure 11:
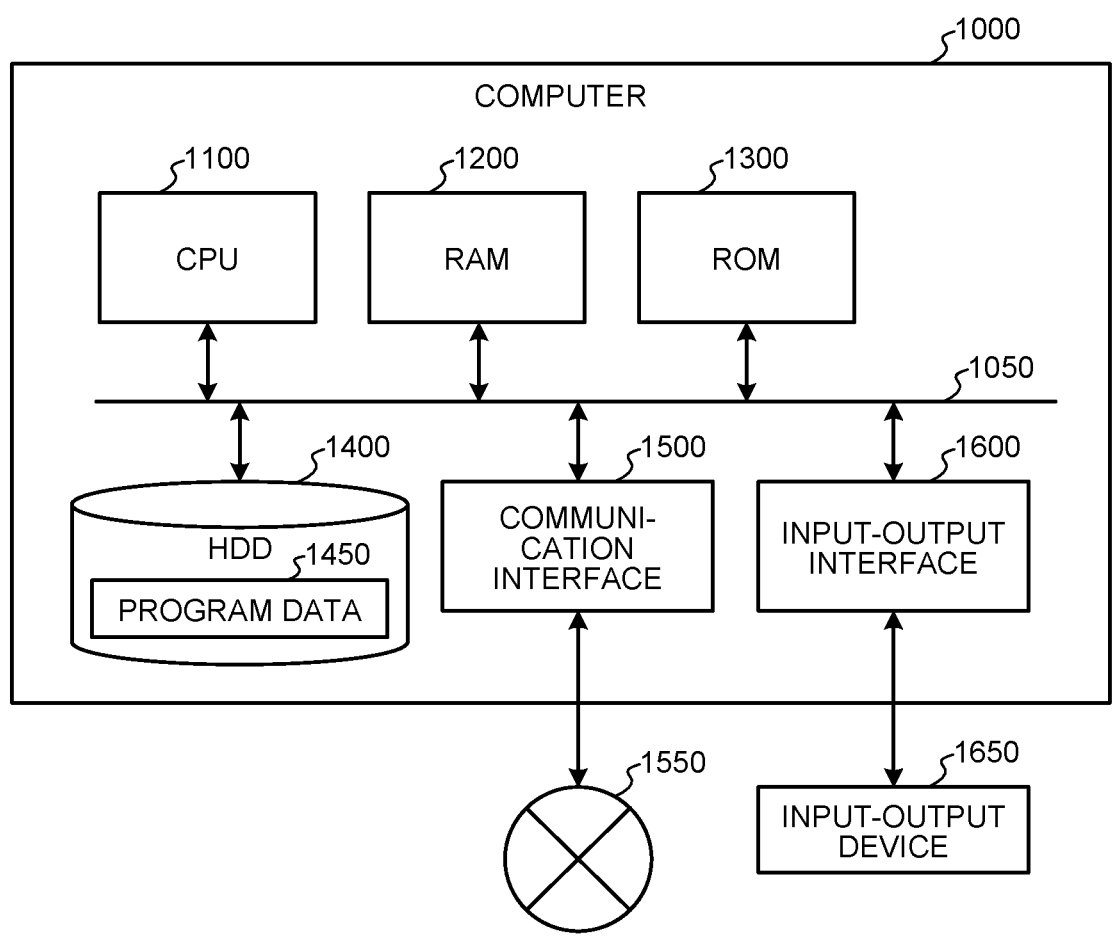
FIG. 11 is a hardware configuration diagram illustrating an example of a computer that implements functions of a response generation device.

The information device such as the response generation device 10 and the external server 200 according to each embodiment described above is achieved by a computer 1000 having a configuration as illustrated in FIG. 11, for example. Hereinafter, the response generation device 10 according to the embodiment will be described as an example. FIG. 11 is a hardware configuration diagram illustrating an example of the computer 1000 that implements the functions of the response generation device 10. The computer 1000 includes a CPU 1100, a RAM 1200, a read only memory (ROM) 1300, a hard disk drive (HDD) 1400, a communication interface 1500, and an input-output interface 1600. Each unit of the computer 1000 is connected by a bus 1050.

The CPU 1100 operates on the basis of a program stored in the ROM 1300 or the HDD 1400, and controls each unit. For example, the CPU 1100 develops a program stored in the ROM 1300 or the HDD 1400 in the RAM 1200, and executes processing corresponding to various programs.

The ROM 1300 stores a boot program such as a basic input output system (BIOS) executed by the CPU 1100 when the computer 1000 is activated, a program depending on hardware of the computer 1000, and the like.

The HDD 1400 is a computer-readable recording medium that non-transiently records a program executed by the CPU 1100, data used by such a program, and the like. Specifically, the HDD 1400 is a recording medium that records a response generation program according to the present disclosure as an example of program data 1450.

The communication interface 1500 is an interface for the computer 1000 to connect to an external network 1550 (for example, the Internet). For example, the CPU 1100 receives data from another device or transmits data generated by the CPU 1100 to another device via the communication interface 1500.

The input-output interface 1600 is an interface for connecting an input-output device 1650 and the computer 1000. For example, the CPU 1100 receives data from an input device such as a keyboard and a mouse via the input-output interface 1600. Further, the CPU 1100 transmits data to an output device such as a display, a speaker, or a printer via the input-output interface 1600. Further, the input-output interface 1600 may function as a media interface that reads a program or the like recorded in a predetermined recording medium. The medium is, for example, an optical recording medium such as a digital versatile disc (DVD) or a phase change rewritable disk (PD), a magneto-optical recording medium such as a magneto-optical disk (MO), a tape medium, a magnetic recording medium, a semiconductor memory, or the like.

For example, in a case where the computer 1000 functions as the response generation device 10 according to the embodiment, the CPU 1100 of the computer 1000 achieves the functions of the acquisition unit 40 and the like by executing the response generation program loaded on the RAM 1200. Further, the HDD 1400 stores a response generation program according to the present disclosure and data in the storage unit 30. Note that the CPU 1100 reads the program data 1450 from the HDD 1400 and executes the program data 1450, but as another example, these programs may be acquired from another device via the external network 1550.

Note that the present technology can also have the following configurations.

(1)

A response generation device comprising:

an acquisition unit that acquires input information that triggers generation of a response to a user; and a response generation unit that selects, on a basis of an analysis result of the input information, a model to be used in generating a response corresponding to the input information and generates a response to the user using the selected model.

(2)

The response generation device according to (1), wherein the acquisition unit acquires voice information uttered by the user as the input information.

(3)

The response generation device according to (2), wherein the response generation unit selects the model on a basis of a signal-to-noise ratio (SN ratio) in the voice information.

(4)

The response generation device according to (2) or (3), wherein the response generation unit selects the model on a basis of a non-sentence level when the voice information is converted into a character string.

(5)

The response generation device according to (1), wherein the acquisition unit acquires a character string input by the user as the input information.

(6)

The response generation device according to (5), wherein the response generation unit selects the model on a basis of a non-sentence level of the character string input by the user.

(7)

The response generation device according to any one of (1) to (6), wherein the response generation unit selects a plurality of the models on a basis of the analysis result of the input information, and generates a response to the user on a basis of output results output from the selected plurality of the models.

(8)

The response generation device according to any one of (1) to (7), wherein the response generation unit selects a model according to the analysis result from a plurality of models having different maximum numbers of words on which features used for semantic analysis of the input information depend.

(9)

The response generation device according to any one of (1) to (7), wherein the response generation unit selects a model according to the analysis result from a plurality of models having different maximum numbers of characters on which features used for semantic analysis of the input information depend.

(10)

The response generation device according to any one of (1) to (9), wherein the response generation unit selects a model according to the analysis result from a plurality of models having different noise levels applied to a corpus used for semantic analysis of the input information.

(11)

The response generation device according to any one of (1) to (10), wherein the response generation unit selects a model according to the analysis result from a plurality of models having different usage modes of dictionary data used for semantic analysis of the input information.

(12)

The response generation device according to (11), wherein the response generation unit selects a model according to the analysis result from a plurality of models having different determination granularities of homonyms in the dictionary data.

(13)

The response generation device according to any one of (1) to (12), wherein the response generation unit calculates reliability of a model selected for the input information or a response generated by the model on a basis of the analysis result of the input information.

(14)

The response generation device according to (13), wherein the response generation unit calculates the reliability on a basis of a signal-to-noise ratio (SN ratio) in a portion of the input information used in determining a field of response to the input information.

(15)

The response generation device according to (13) or (14), wherein the response generation unit outputs the calculated reliability to an external service used in generating the response.

(16)
The response generation device according to any one of (13) to (15), wherein
the response generation unit
determines an execution risk regarding the response generated for the user on a basis of the calculated reliability.
(17)
The response generation device according to any one of (1) to (16), wherein
the acquisition unit
acquires, together with the input information, context information when the input information is input, and
the response generation unit
selects the model on a basis of the analysis result of the input information and the context information.
(18)
The response generation device according to (17), wherein
the acquisition unit
acquires the context information of the user on a basis of information input from the user in a past before the input information or content of a response output to the user in the past.
(19)
The response generation device according to (17) or (18), wherein
the acquisition unit
acquires the context information of the user on a basis of a place where the user is located, a date and time when the input information is input, attribute information of the user, or schedule information of the user.
(20)
A response generation method, by a computer, comprising:
acquiring input information that triggers generation of a response to a user; and
selecting, on a basis of an analysis result of the input information, a model to be used in generating a response corresponding to the input information and generating a response to the user using the selected model.

REFERENCE SIGNS LIST

1 RESPONSE GENERATION SYSTEM
10 RESPONSE GENERATION DEVICE
20 SENSOR
21 INPUT UNIT
22 COMMUNICATION UNIT
30 STORAGE UNIT
31 FIRST MODEL TABLE
32 SECOND MODEL TABLE
40 ACQUISITION UNIT
41 DETECTION UNIT
42 REGISTRATION UNIT
43 RECEPTION UNIT
50 RESPONSE GENERATION UNIT
51 SIGNAL PROCESSING UNIT
52 VOICE RECOGNITION UNIT
54 SELECTION UNIT
55 SEMANTIC ANALYSIS UNIT
56 RESPONSE UNIT
57 TRANSMISSION UNIT
60 OUTPUT UNIT
200 EXTERNAL SERVER

The invention claimed is:

1. A response generation device, comprising:
an acquisition unit configured to acquire input information that triggers generation of a response to a user; and
a response generation unit configured to:
select, based on an analysis result of the input information, a first model from a first plurality of models; and
generate, based on the selected first model, the response to the user corresponding to the input information, wherein:
the first plurality of models has different maximum numbers of characters, and
features used for semantic analysis of the input information is based on the different maximum numbers of characters.

2. The response generation device according to claim 1, wherein
the acquisition unit is further configured to acquire voice information uttered by the user as the input information.

3. The response generation device according to claim 2, wherein
the response generation unit is further configured to select the first model based on a signal-to-noise ratio (SN ratio) in the voice information.

4. The response generation device according to claim 2, wherein
the response generation unit is further configured to select the first model based on a non-sentence level in a case the voice information is converted into a character string.

5. The response generation device according to claim 1, wherein
the acquisition unit is further configured to acquire a character string input by the user as the input information.

6. The response generation device according to claim 5, wherein
the response generation unit is further configured to select the first model based on a non-sentence level of the character string input by the user.

7. The response generation device according to claim 1, wherein
the response generation unit is further configured to:
select a second plurality of models based on the analysis result of the input information; and
generate the response to the user based on output results output from the selected second plurality of models.

8. The response generation device according to claim 1, wherein
the response generation unit is further configured to select a second model from a second plurality of models that has different maximum numbers of words, wherein the features used for the semantic analysis of the input information is based on the different maximum number of words.

9. The response generation device according to claim 1, wherein
the response generation unit is further configured to select a second model, based on the analysis result, from a second plurality of models having different noise levels applied to a corpus used for the semantic analysis of the input information.

10. The response generation device according to claim 1, wherein
the response generation unit is further configured to select a second model, based on the analysis result, from a second plurality of models that has different usage modes of dictionary data used for the semantic analysis of the input information.

11. The response generation device according to claim 10, wherein
the response generation unit is further configured to select a third model, based on the analysis result, from a third plurality of models that has different determination granularities of homonyms in the dictionary data.

12. The response generation device according to claim 1, wherein
the response generation unit is further configured to calculate reliability of:
the first model selected for the input information, or
the response generated by the first model, wherein the reliability is calculated based on the analysis result of the input information.

13. The response generation device according to claim 12, wherein
the response generation unit is further configured to calculate the reliability based on a signal-to-noise ratio (SN ratio) in a portion of the input information used to determine a field of response to the input information.

14. The response generation device according to claim 12, wherein
the response generation unit is further configured to output the calculated reliability to an external service used to generate the response.

15. The response generation device according to claim 12, wherein
the response generation unit is further configured to determine an execution risk regarding the response generated for the user, wherein the execution risk is determined based on the calculated reliability.

16. The response generation device according to claim 1, wherein
the acquisition unit is further configured to acquire, together with the input information, context information in a case the input information is input, and
the response generation unit is further configured to select the first model based on the context information and the analysis result of the input information.

17. The response generation device according to claim 16, wherein
the acquisition unit is further configured to acquire the context information of the user based on information input from the user before the input information or content of a response output to the user in a past.

18. The response generation device according to claim 16, wherein
the acquisition unit is further configured to acquire the context information of the user based on a place where the user is located, a date and time when the input information is input, attribute information of the user, or schedule information of the user.

19. A non-transitory computer-readable medium having stored thereon, computer-executable instructions that, when executed by a computer, cause the computer to execute operations, the operations comprising:
acquiring input information that triggers generation of a response to a user;
selecting, based on an analysis result of the input information, a model from a plurality of models; and
generating, based on the selected model, the response to the user corresponding to the input information,
wherein:
the plurality of models has different maximum numbers of characters, and
features used for semantic analysis of the input information is based on the different maximum numbers of characters.

* * * * *